(12) United States Patent
Milner

(10) Patent No.: US 6,993,483 B1
(45) Date of Patent: Jan. 31, 2006

(54) METHOD AND APPARATUS FOR SPEECH RECOGNITION WHICH IS ROBUST TO MISSING SPEECH DATA

(75) Inventor: Benjamin P Milner, Norfolk (GB)

(73) Assignee: British Telecommunications public limited company, London (GB)

(*) Notice: Subject to any disclaimer, the term of this patent is extended or adjusted under 35 U.S.C. 154(b) by 621 days.

(21) Appl. No.: 10/089,562

(22) PCT Filed: Nov. 2, 2000

(86) PCT No.: PCT/GB00/04206

§ 371 (c)(1),
(2), (4) Date: Apr. 2, 2002

(87) PCT Pub. No.: WO01/33554

PCT Pub. Date: May 10, 2001

(30) Foreign Application Priority Data

Nov. 2, 1999 (EP) .................................. 99308680

(51) Int. Cl.
*G10L 15/26* (2006.01)
(52) U.S. Cl. .................................................. 704/236
(58) Field of Classification Search ............... 704/201, 704/205, 228, 500; 375/240; 714/747
See application file for complete search history.

(56) References Cited

U.S. PATENT DOCUMENTS

| 4,907,277 | A | | 3/1990 | Callens et al. | |
|---|---|---|---|---|---|
| 5,710,781 | A | * | 1/1998 | Zinser et al. | ............... 714/747 |
| 6,006,173 | A | * | 12/1999 | Wiese et al. | ............... 704/201 |
| 6,351,727 | B1 | * | 2/2002 | Wiese et al. | ............... 704/201 |
| 6,775,652 | B1 | * | 8/2004 | Cox et al. | ................... 704/236 |

FOREIGN PATENT DOCUMENTS

| EP | 0 872 827 A2 | 10/1998 |
|---|---|---|
| WO | WO 95/17746 | 6/1995 |
| WO | WO 00/30072 | 5/2000 |

OTHER PUBLICATIONS

Perkins et al IEEE Network, vol. 12, No. 5, Sep. 1998-Oct. 1998 pp. 40-48 XP002133605 A Survey of packet loss recovery techniques for streaming audio, no day.
Milner et al IEEE International Conference on Acoustics, Speech and Signal Processing Jun. 2000, pp 1791-1794 vol. 3, XP002156639 Robust speech recognition over IP networks, no day.

* cited by examiner

*Primary Examiner*—Susan McFadden
(74) *Attorney, Agent, or Firm*—Nixon & Vanderhye, P.C.

(57) ABSTRACT

A speech recognizer suitable for distributed speech recognition is robust to missing speech feature vectors. Speech is transmitted via a packet switched network in the form of basic feature vectors. Missing feature vectors are detected and replacement feature vectors are estimated by interpolation of received data prior to speech recognition. Features may be converted and interpolation may be accomplished in a spectral domain.

14 Claims, 7 Drawing Sheets

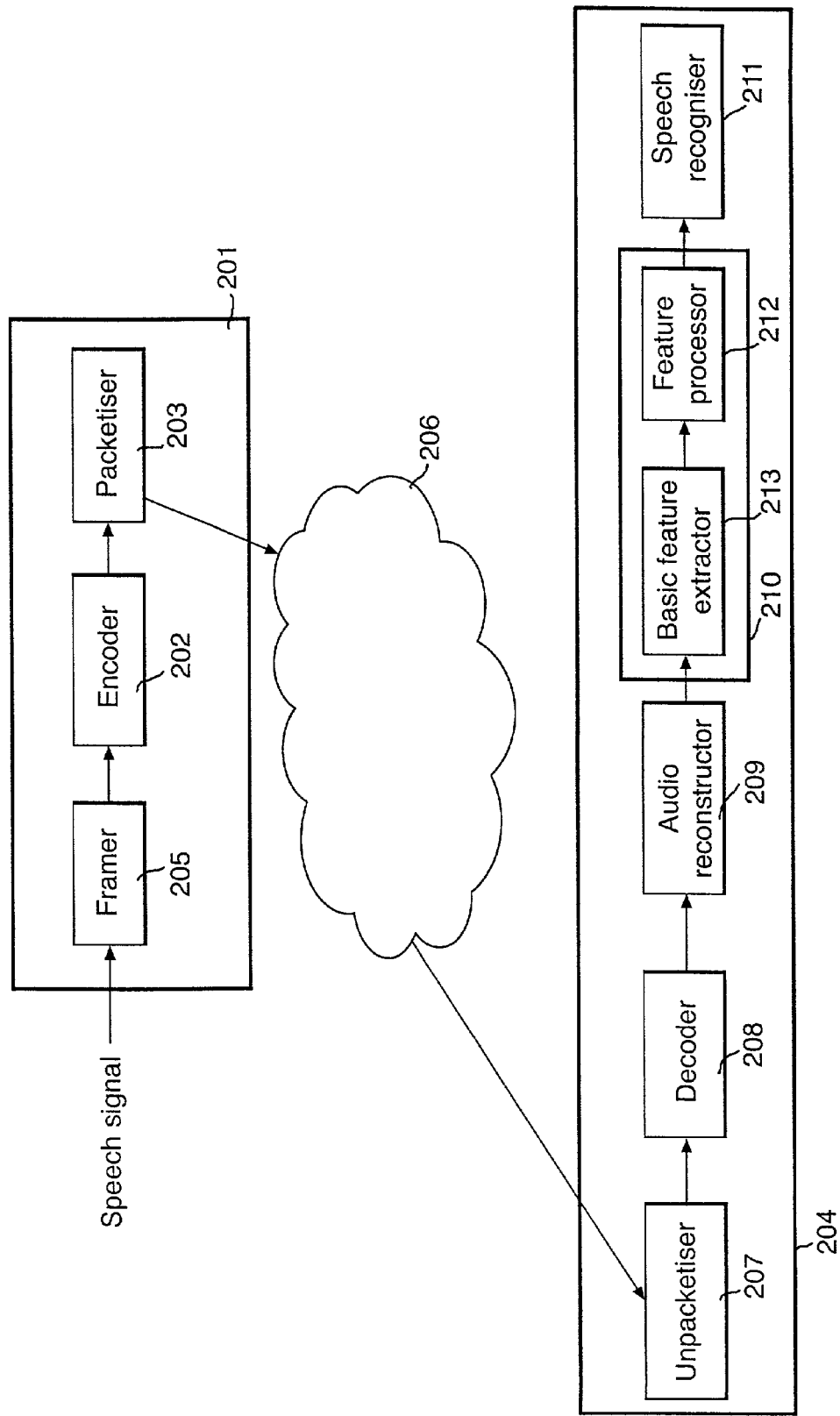

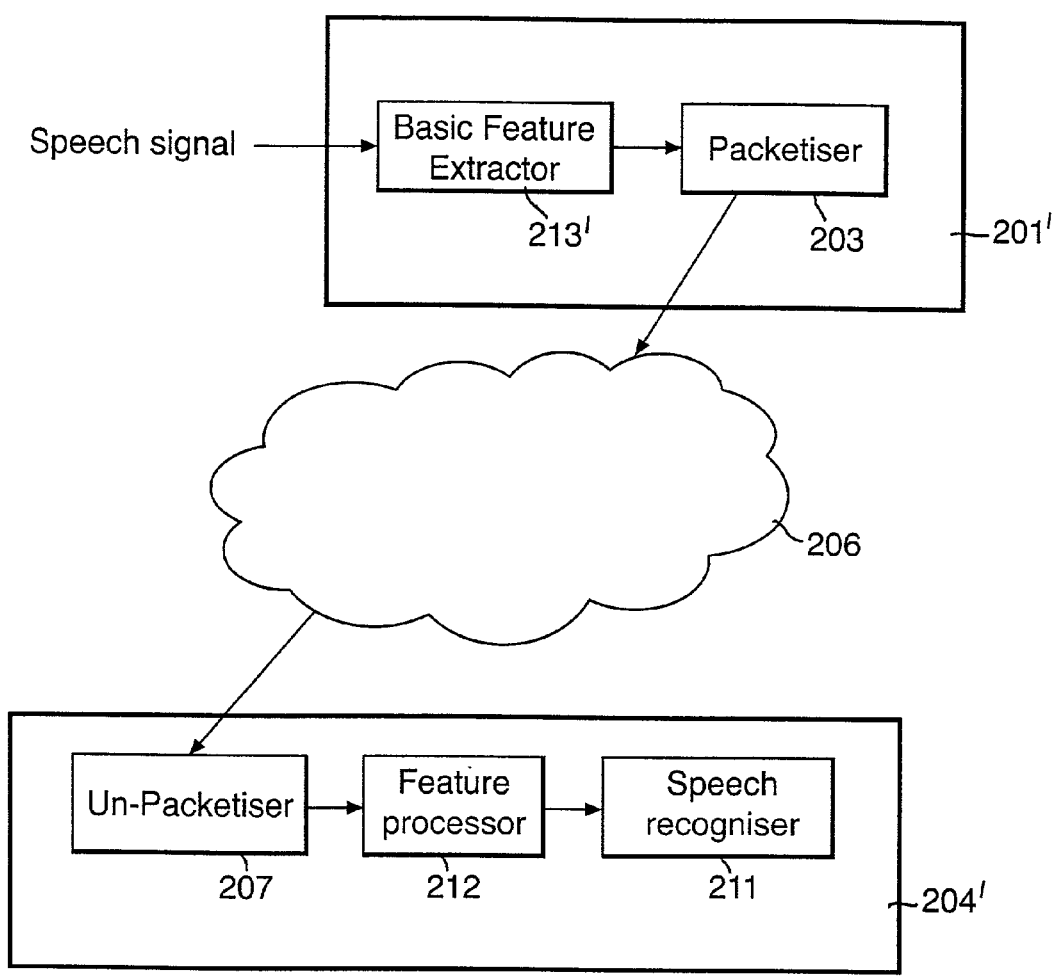
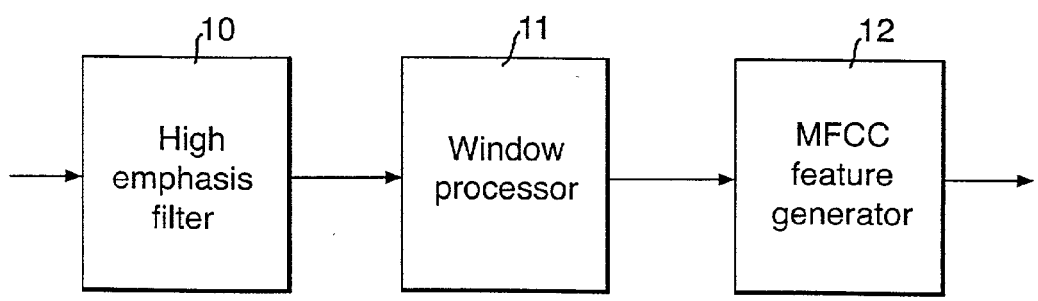

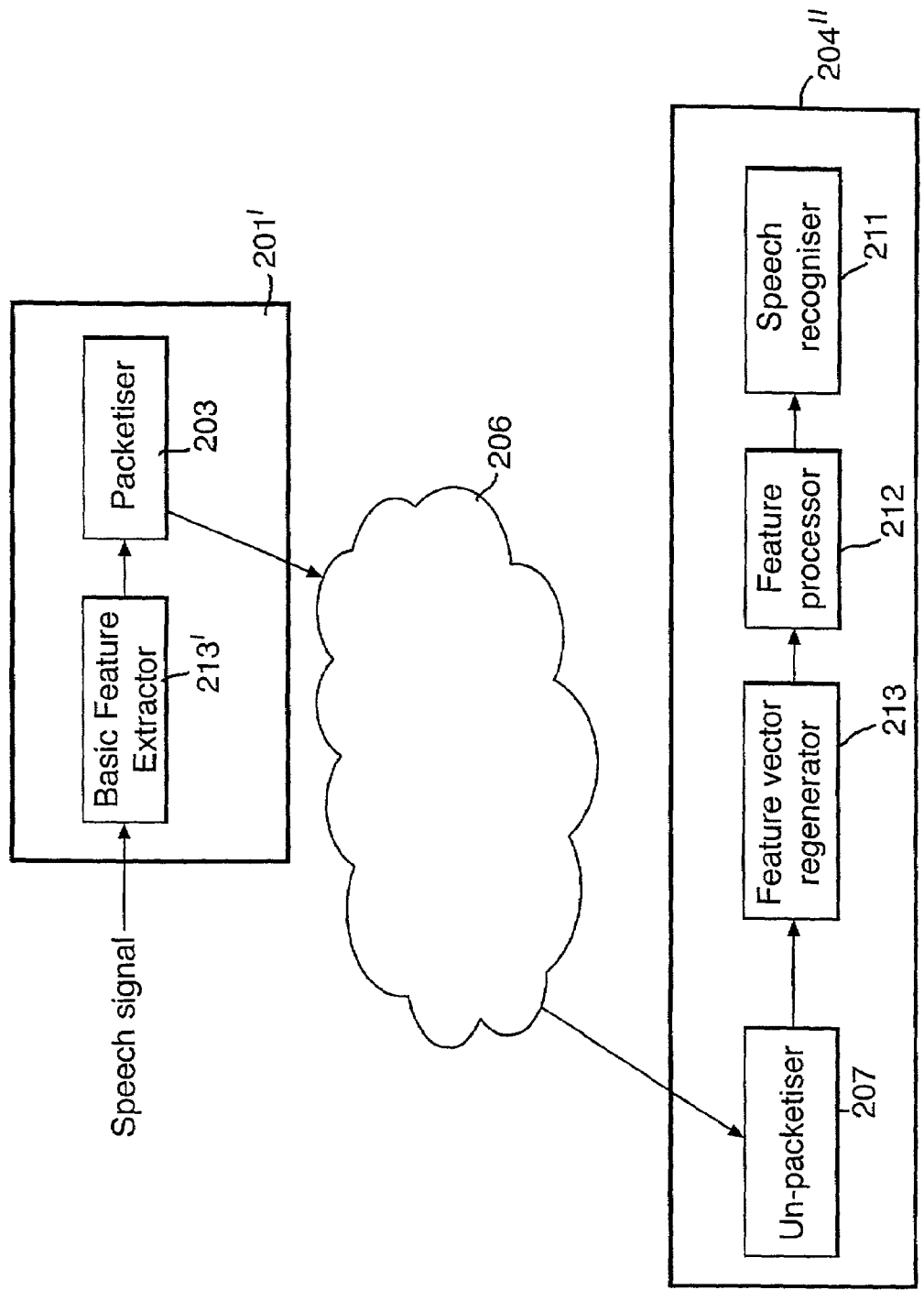

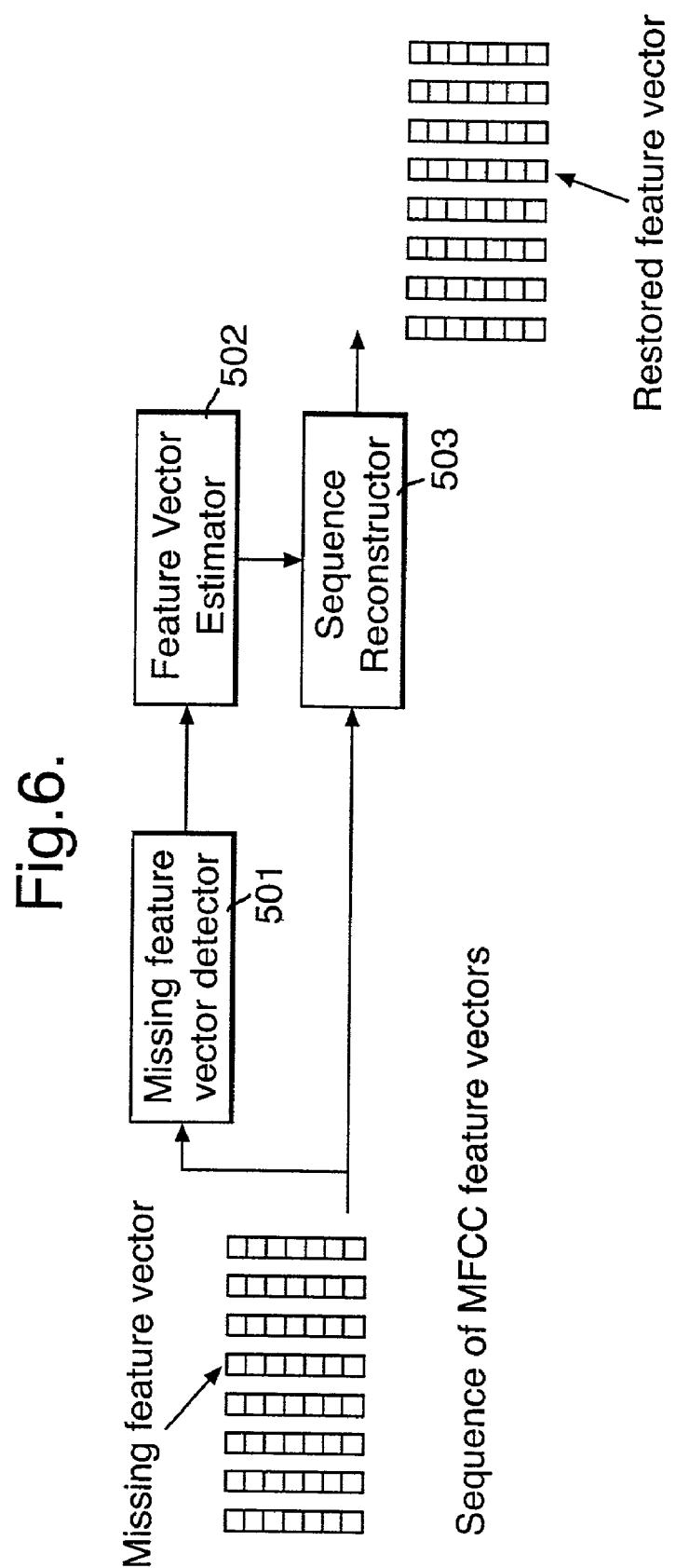

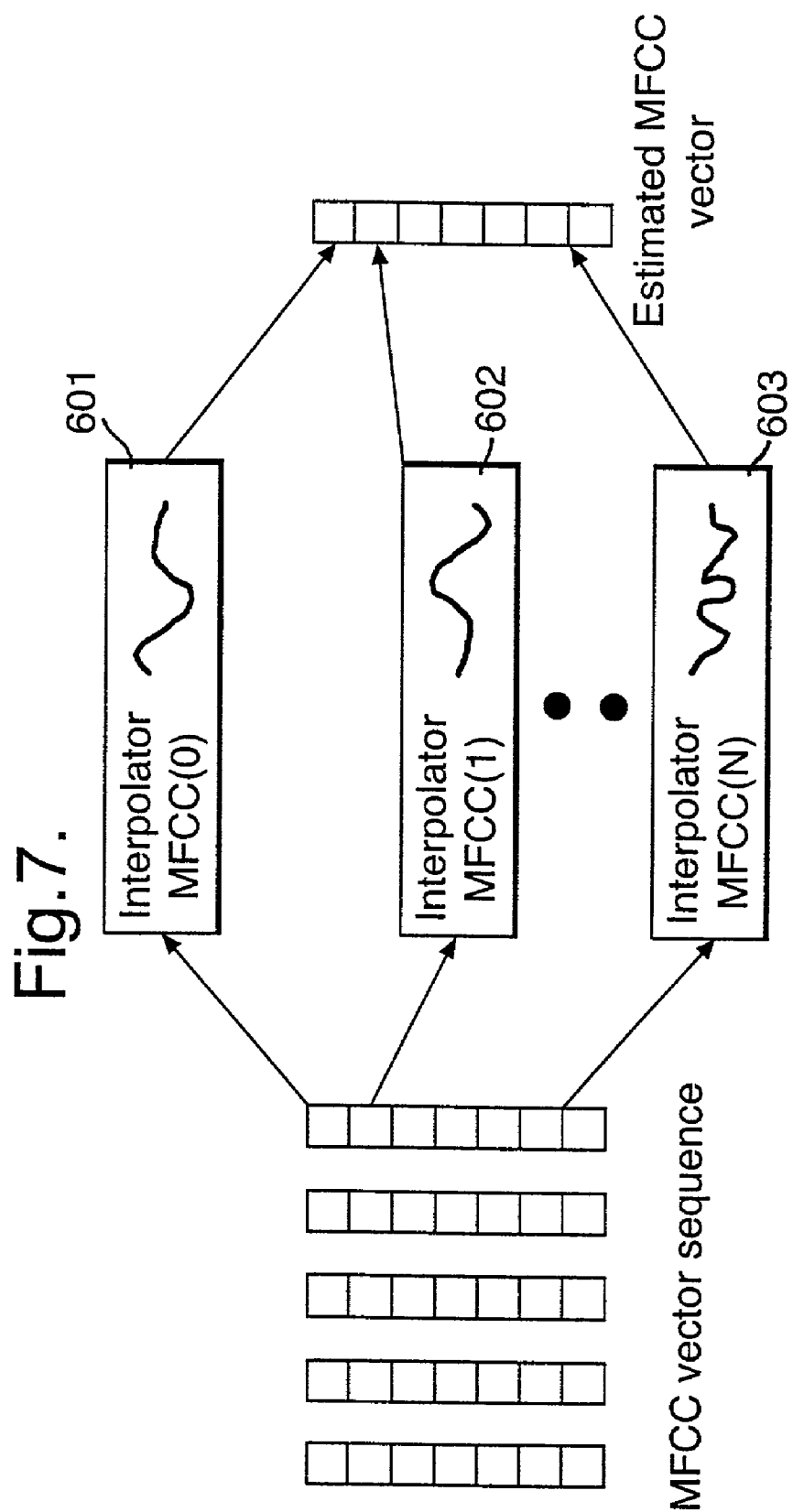

METHOD AND APPARATUS FOR SPEECH RECOGNITION WHICH IS ROBUST TO MISSING SPEECH DATA

This application is the U.S. national phase of international application PCT/GB00/04206 filed Nov. 2, 2000 which designated the U.S.

BACKGROUND

1. Technical Field

This invention relates to a method of and an apparatus for speech recognition which is robust to missing speech data. It is particularly useful in distributed speech recognition in which data is transmitted via a packet switched network.

2. Description of Related Art

Recently there has been an enormous increase in the use of mobile devices such as mobile phones and personal digital assistants. It is desirable to make the human to device interface as natural and easy to use as possible. Speech recognition is one solution which increases naturalness, and overcomes the difficulties in using very small keyboards found on many mobile devices. A Personal Computer (PC) usually provides sufficient processing power to operate a speech recogniser. However, on mobile devices processing power is a limiting factor. One solution is to use distributed speech recognition (DSR). DSR makes use of remote speech recognisers which are accessed by a device across a transmission network. Speech data from the device is transmitted across the network to the remote speech recogniser and the remote speech recogniser processes the speech to provide a recognition result (or set of results) which is then transmitted back to the device.

There are basically two types of network across which such information can be transmitted; namely connection-orientated networks and connectionless networks. The connection-orientated network is essentially the telephony service which has evolved over the last 100 years for the switching and transmission of voice data. A connectionless network is packet-based and its main functionality is the routing and switching of data packets from one location to another.

When a call is made on a connection-orientated network a reservation is made to ensure that sufficient network resources are available to sustain the call. This may be the allocation of a physical connection or of time slots in a pulse code modulation (PCM) system. If sufficient resources are not available then the call is refused, typically accompanied by an engaged signal.

The connectionless network is very much aimed at the routing and switching of data packets and is designed to efficiently handle the high burstiness of this traffic. Packets are comprised of two parts—a header and payload. The header contains information regarding the source and destination address while the payload contains the actual data which needs to be sent.

For transmitting real-time data such as speech, the essential difference between the two networks is that the connection-orientated network reserves sufficient capacity, or bandwidth, to maintain a connection throughout the call. With a connectionless network sufficient bandwidth is not guaranteed which means that the network may produce delays or missing packets which interrupt the data transmission. Therefore the connection-orientated network is much better suited to delivering real-time data. Voice has therefore traditionally been transmitted using connection-orientated networks. However, because of the enormous growth in data networks, the technique of Voice over Internet Protocol (VoIP) has been developed to allow the real-time transmission of voice signals across connectionless networks.

In a connectionless network the packets containing the speech can be routed across a wide variety of paths depending on the network traffic. Indeed, it may be that successive packets are routed around the network on different paths. As a result it is possible that some packets arrive out of sequence or may never even arrive. This is clearly undesirable in a DSR system as it will introduce recognition errors. An approach to dealing with this problem of missing packets is to use protocols designed specifically real-time data which ensure all the data arrives with minimal delay.

The traditional connectionless network is termed best-effort. This means that packets from a source are sent to a destination with no guarantee of a timely delivery. For applications such as file transfer which require a guarantee of delivery, Transmission Control Protocol (TCP) is able to trade packet delay for guaranteed reception. In the event of lost packets TCP allows for the destination to request the retransmission of those lost packets. However, for real-time data it is important to minimise transmission delays. It is therefore impracticable to use TCP and wait for the retransmission of lost packets. A better approach is to use User Datagram Protocol (UDP) as the protocol for sending the packets. This has-a short duration buffer which allows for slight delays in packet arrival after which UDP assumes the packet is not going to arrive. No facility for the retransmission of lost packets is available. This has the advantage that delays are minimised but at the expense of possibly losing some of the speech signal when network traffic is high and packet loss is probable.

Protocols designed specifically for real-time data transmission include Resource Reservation Protocol (RSVP). This is a signalling protocol which reserves network resources at the start of a call to ensure that a direct connection to the destination is available throughout. In effect it makes a connection-orientated path from a connectionless network. In order for this to function all the routers in the network from the source to destination must be RSVP enabled. As RSVP is a relatively new protocol not all routers are equipped with this facility.

Another protocol designed specifically for real-time data transmission is DiffServ. This makes use of a byte of data in the packet header to specify a Type of Service (ToS)—i.e. how much priority should be given to the immediate routing of that packet through the network. Clearly some data will have very high priority such as network management and system commands. Lower priority will be given to file transfer and email where immediate delivery is not too important. Depending on the emphasis given to the network, high priority can be given to speech packets to assist real-time use. Again, this protocol is only in development and not available generally.

The increase of connectionless voice networks, coupled with the increase in automation of call centres means that the ability to perform robust speech recognition over a connectionless network is becoming more important.

An alternative approach to ensuring that all packets containing the speech signal successfully reach the speech recogniser is to make the recogniser itself robust to missing packets. When the packet loss is low (<5%) the drop in recognition performance is not too significant. However, as packet loss increases—or occurs in bursts—the effect is more detrimental. Therefore, a speech recogniser is required which is able to tolerate this loss of speech.

Known signal processing techniques which deal with missing packets range from very simple to complex—a good review is made in C. Perkins, O. Hodson and V. Hardman, "A survey of packet loss recovery techniques for streaming audio", IEEE Network Magazine, Vol. 12, No. 5, pp. 40–48, October 1998. Simple techniques include splicing which merely joins the speech signal together either side of the gap. Silence and noise substitution replace the missing frames of speech with either silence or noise. Repetition replaces the lost frames of speech with copies of the speech which arrived before the gap.

More sophisticated techniques attempt to estimate the missing parts of the signal from those parts which have been correctly received. These include waveform substitution which uses the pitch on either side of the gap to estimate the missing speech. Time scale modification stretches the audio signal either side of the gap to fill in the missing speech. Regeneration-based repair uses parameters of the codec to determine the required fill-in speech. All these techniques attempt to reconstruct the time-domain speech signal.

BRIEF SUMMARY OF NON-LIMITING EXEMPLARY EMBODIMENTS

According to the present invention there is provided a method of speech recognition comprising the steps of receiving a sequence of transmitted feature vectors, said feature vectors representing a speech signal; detecting the absence of a feature vector in the received sequence; generating an estimated replacement feature vector for the detected absent feature vector; inserting said replacement feature vector into the received feature vector sequence to provide a modified feature vector sequence; and performing speech recognition upon the modified feature vector sequence.

Preferably the feature vector comprises a plurality of components and the generating step comprises estimating a component of a replacement feature vector by interpolating the corresponding component of a received feature vector.

In a preferred embodiment the estimating step uses an interpolation coefficient corresponding to a component of the received feature vector and further comprising the step of updating the interpolation coefficient in response according to one or more received feature vectors.

In an alternative embodiment of the invention the transmitted feature vectors include features in a cepstral domain, and in which the estimating step comprises the sub steps of converting a received feature vector to a spectral domain; estimating a spectral component by interpolating the corresponding component of the converted feature vector; and converting the estimated spectral component to said cepstral domain.

According to another aspect of the invention there is provided a device for performing speech recognition upon a sequence of parameterised feature vectors comprising a missing feature vector detector arranged in operation to receive the transmitted feature vectors and to indicate the absence of a feature vector in the received sequence; a feature vector estimator arranged, in operation, to receive transmitted feature vectors and responsive to said indication from the missing feature vector detector to estimate a replacement feature vector; a sequence reconstructer arranged, in operation, to receive transmitted feature vectors and to receive a replacement feature vector and to provide as an output a modified feature vector sequence; and a speech recogniser arranged, in operation, to receive the modified feature vector sequence.

Preferably the feature vector estimator comprises an interpolator arranged to receive a feature vector and to provide as an output a component of the replacement feature vector.

In a preferred embodiment in the interpolator uses an interpolation coefficient corresponding to a component of the received feature vector and in which the interpolator is arranged to update the interpolation coefficient in response to receipt of a feature vector.

In an alternative embodiment of the invention the feature vector estimator comprises a first converter for converting a received feature vector to a spectral domain; an estimator for estimating a spectral component by interpolating the corresponding component of the converted frame; a second converter for converting the estimated spectral component to said cepstral domain.

A data carrier loadable into a computer and carrying instructions for causing the computer to carry out a method according to the invention and a data carrier loadable into a computer and carrying instructions for enabling the computer to provide the device according to the invention are also provided.

BRIEF DESCRIPTION OF THE DRAWINGS

Embodiments of the invention will now be described, by way of example only, with reference to the accompanying drawings in which:

FIG. 2 is a functional block diagram showing program elements for software embodying a known technique for performing DSR;

FIG. 3 is a functional block diagram showing program elements for software embodying another known technique for performing DSR;

FIG. 4 is a functional block diagram of program elements that comprise a parameteriser of FIGS. 2 and 3;

FIG. 5 is a functional block diagram of the program elements that comprise the software indicated in FIG. 1;

FIG. 6 is a functional block diagram of the program elements which comprise a feature vector regenerator of FIG. 5;

FIG. 7 is a functional block diagram of the program elements that comprise a frame estimator shown in FIG. 6 in one embodiment of the invention.

DETAILED DESCRIPTION OF NON-LIMITING EXEMPLARY EMBODIMENTS

Figure 1:
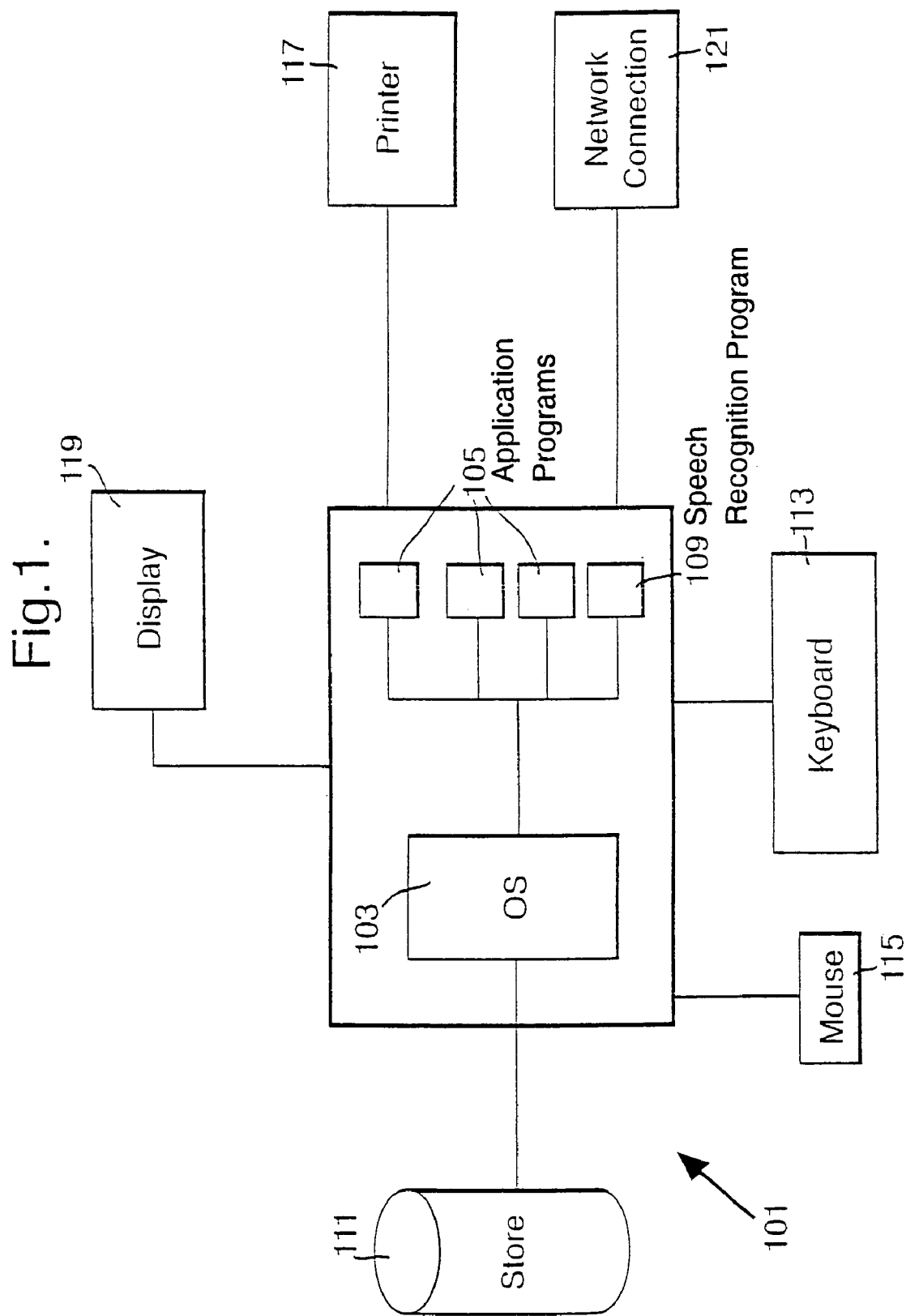
FIG. 1 is a schematic representation of a computer loaded with software embodying the present invention.

FIG. 1 illustrates a conventional computer 101, such as a PC, running a conventional operating system 103, such as Windows (a Registered Trade Mark of Microsoft Corporation), and having a number of resident application programs 105 including a word processing program, a network browser and e-mail program and a database management program. The computer 101 is also connected to a conventional disc storage unit 111 for storing data and programs, a keyboard 113 and mouse 115 for allowing user input and a printer 117 and display unit 119 for providing output from the computer 101. The computer 101 also has access to external networks (not shown) via a network card 121. The computer 101 also includes a speech recognition program 109 that enables a speech signal received via the network card 121 to be recognised.

In FIG. 2, a mobile device 201 includes a framer 205 which divides a received speech signal into short duration frames, for example 30 ms, and sends the resultant frames to an encoder 202. The encoder 202 encodes each frame of received speech into a suitable coded representation, for example using the standard codec defined in ITU-G.723.1, and the resultant coded representation is sent to a packetiser 203. The coded representation forms the payload for a packet (not shown) which has a header added by the packetiser 203. The packet is transmitted via a connectionless network 206 to a remote device 204. The remote device 204 includes an unpacketiser 207 which removes the header, and a decoder 208 which decodes the coded representation of the speech frame. Speech frames are sent from the decoder 208 to an audio reconstructor 209 where the speech signal is reconstructed. The speech signal is then parameterised by a parameteriser 210 to form feature vectors suitable for use by a speech recogniser 211. The parameteriser 210 comprises a basic feature extractor 213 and a feature processor 212, the operation of which will be described later.

FIG. 3 shows a system for DSR which avoids encoding and decoding the speech signal of the speech by transmitting parameterised speech signals over the network 206. In FIG. 3 a device 201' includes a basic feature extractor 213' which parameterises speech signals to form feature vectors. The speech feature vectors are packetised by the packetiser 203 and transmitted via the network 206 to a remote device 204'. At the remote device the features are un-packetised by the unpacketiser 207 and transmitted to the speech recogniser 211 via the feature processor 212. This approach is advantageous over the system shown in FIG. 2. Encoding and decoding the signal causes a degradation in quality of the speech signal. This causes a significant reduction in speech recognition performance. By parameterising the speech signal before transmission across the network there is no resultant loss in speech recognition performance. As encoding and decoding of the speech signal is not required there is a significant saving in computation.

The problem of missing packets needs to be addressed. In this invention reconstructing the transmitted feature vector sequence is performed by detecting mising feature vectors and subsequently estimating corresponding replacement feature vectors.

FIG. 5 shows a remote device 204' according to the invention, which is implemented on a conventional computer as illustrated in FIG. 1. After received features have been unpacketised by the un-packetiser 207, missing features are restored by a feature vector regenerator 214.

In the embodiment of the invention described here the basic feature vectors used are Mel-frequency cepstral coefficients (MFCCs). MFCCs are generated from a received speech signal as illustrated in FIG. 4. A high emphasis filter 10, normally referred to as a pre-emphasis filter, receives a digitised speech waveform at, for example, a sampling rate of 8 kHz as a sequence of 8-bit numbers and performs a high emphasis filtering process (for example by executing a $1-0.95.z^{-1}$ filter), to increase the amplitude of higher frequencies.

A sequence of 256 contiguous samples (referred to as a frame in this description) of the filtered signal is windowed by a window processor 11 in which the samples are multiplied by predetermined weighting constants using, in this embodiment of the invention, a Hamming window, to reduce spurious artefacts generated at the edges of the frame. Each frame overlaps with neighbouring frames by 50%, so as to provide one frame every 16 ms.

Each frame of 256 windowed samples is then processed by a MFCC generator 12 to extract an MFCC feature vector comprising eight MFCC's.

The MFCC feature vector is derived by performing a spectral transform, in this embodiment of the invention, a Fast Fourier Transform (FFT), on each frame of a speech signal, to derive a representation of the signal spectrum for each frame of speech. The terms of the spectrum are integrated into a series of broad bands, which are distributed in a 'mel-frequency' scale along the frequency axis, to provide nineteen mel-frequency features. These features are referred to as filterbank features in this description. The mel-frequency scale is a perceptually motivated scale, which comprises frequency bands evenly spaced on a linear frequency scale between 0 and 1 kHz, and evenly spaced on a logarithmic frequency scale above 1 kHz. The logarithm of each mel-frequency feature is calculated and then a Discrete Cosine Transform (DCT) is performed to generate an MFCC feature vector for the frame. Features such as the mel-frequency features described above, which represent the frequencies within a signal are referred to as being features in a spectral domain. Features which represent the rate of change of frequencies in a signal, such as the MFCC's described above are referred to as being in a cepstral domain.

For MFCC's it is found that the useful information is generally confined to the lower order coefficients, so in this embodiment of the invention nine cepstral coefficients are used.

Before the features are transmitted to the feature processor 212, any missing front end feature vectors are restored by the feature vector regenerator illustrated in FIG. 6.

Estimation of missing feature vectors is a simpler problem than estimation of the original time-domain speech signal. Feature vectors are highly correlated with one another in time, and represent a longer portion of speech than a single digital time-domain sample. In the embodiment of the invention described here 256 time-domain samples are represented by 9 MFCC's. The estimation of 9 MFCC's which are highly correlated with preceding and following MFCC's is much simpler than accurate estimation of 256 samples.

In FIG. 6 a stream of MFCCs is shown with one missing feature vector due to the packet having that feature vector as part of it's payload being lost in the network 206. Received MFCCs are first passed into a missing feature vector detector 501 which identifies whether any feature vectors are missing or not. If a missing feature vector is detected a feature vector estimator 502 is used to estimate the missing feature vector. The feature vector sequence is then reconstructed by the sequence reconstructor 503. The resultant reconstructed sequence may then be used for speech recognition is the usual way.

In the embodiment of the invention described here the missing feature vector detector 501 uses feature vector numbering. An additional feature is added to the feature vector by the basic feature extractor 213', the additional feature indicates the position of each feature vector in the feature vector sequence. At the remote device 204" the missing feature vector detector 501 checks the feature vector number of each feature vector received and uses this number to detect whether there are any missing feature vectors, and if so how many. When one or more missing feature vectors are detected a signal is sent to the feature vector estimator 502.

The feature vector estimator 502 uses interpolation to estimate the missing speech features. Each feature is estimated separately and the time series of each is used to form a polynomial which enables missing elements to be estimated. In this embodiment of the invention a simple straight line interpolation is used. A detailed description of interpolation algorithms is provided in S. V. Vaseghi, "Advanced signal processing and digital noise reduction", John-Wiley, 1996.

FIG. 7 illustrates interpolation of a MFCC feature vector. For each feature in the feature vector a corresponding interpolator 601, 602, . . . 609 is established. As each new feature vector arrives the interpolation coefficients for each feature of the feature vector are updated. When a missing feature vector is detected by the missing feature vector detector 501 an estimate of the missing feature vector is made using the interpolators 601, 602, . . . 609. The estimate of the missing frame is then inserted into the feature vector sequence by the sequence reconstructor 503.

Figure 8:
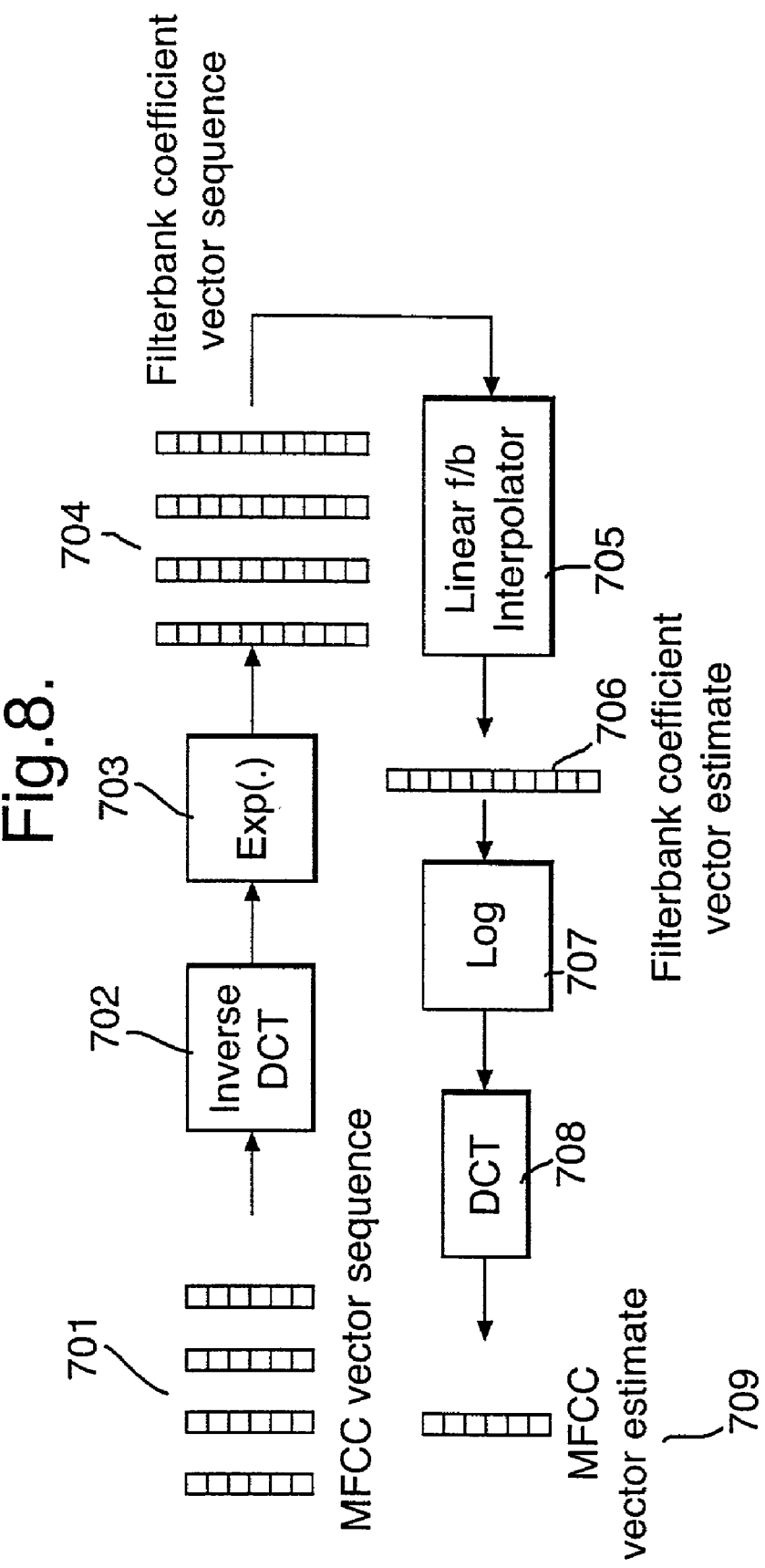
FIG. 8 is a functional block diagram of the program elements that comprise the frame estimator shown in FIG. 6 in a second embodiment of the invention.

In another embodiment of the invention the MFCC feature vectors, which are in the cepstral domain are converted back into the spectral domain so that interpolation is performed on features which represent the frequencies in the original signal. Upon detection of a missing feature vector the interpolator produces an estimate of a filterbank feature vector. This is then logged and a DCT applied to transform the estimate into the MFCC domain. This is illustrated in FIG. 8 in which a sequence of received MFCC feature vectors 701 has an inverse DCT applied to it at 702, and is exponentiated at 703 (i.e. the inverse of a logarithm is applied) to provide a sequence of filterbank feature vectors. A filterbank interpolator 705 is used to provide a filterbank estimate 706 of a missing feature vector, and the filterbank estimate 706 has a logarithm calculated at 707 and a DCT applied at 708 to provide an MFCC estimate 709.

After the feature vector sequence has been reconstructed by the feature vector regenerator 214, processing of the basic features prior to recognition is performed by the feature processor 212. RASTA filtering is applied by bandpass filtering the time series of feature vectors. A detailed description of RASTA filtering may be found in H. Hermansky and N. Morgan, "RASTA processing of speech", IEEE Trans. Speech and Audio Proc., vol. 2, no. 4, pp. 578–589, October 1994. Any channel distortion is additive in the cepstral domain, so applying a sharp cut-off highpass filter to each of the features, across time, removes any offset and hence suppresses channel distortion. Cepstral Time Matrix (CTM) features are then calculated by taking a DCT across a sequence of seven MFCCs. A detailed description of CTM features may be found in B. P. Milner, "Inclusion of temporal information into features for speech recognition", Proc. ICSLP, pp. 256–259, 1996.

It will be appreciated by those skilled in the art that the technique described could be applied to other types of basic speech parameterisation. Cepstral features may be calculated using a Fourier transform as described here, or using linear predictive (LP) analysis. It can be proven that the resultant cepstrum from either of these two routes is identical. In the embodiment of the invention described here the Fourier transform based cepstrum has been modified to include a mel-scale filterbank resulting in MFCC's.

A process similar to the mel-scale filterbank is used in perceptual linear predictive (PLP) analysis where a set of critical-band filters are convolved with the speech spectrum. These modify the spectrum according to perceptual measurements of human hearing and lead to the PLP cepstrum.

It will also be appreciated by those skilled in the art that other feature vector processing techniques could be applied, for example differential features may be calculated, such as 'velocity' and 'acceleration' of the basic features. Cepstral mean normalisation in which the average of each feature is subtracted from each feature respectively, may be used. Linear discriminant analysis (LDA) as described in E. J. Paris and M. J. Carey, "Estimating linear discriminant parameters for continuous density HMMs", Proc. ICSLP, pp. 215–218, 1994 may also be used.

As will be understood by those skilled in the art, the speech recognition program 109 can be contained on various transmission and/or storage mediums such as a floppy disc, CD-ROM, or magnetic tape so that the program can be loaded onto one or more general purpose computers or could be downloaded over a computer network using a suitable transmission medium.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. A method of speech recognition comprising:
   receiving a sequence of transmitted feature vectors, said feature vectors representing a speech signal and comprising features in a parameterized domain determined by processing basic features of the speech signal;
   detecting the absence of a feature vector in the received sequence;
   generating an estimated replacement feature vector for the detected absent feature vector by converting a received differential feature vector to a spectral domain, estimating a spectral component of said feature vector by interpolating the corresponding component of the converted feature vector, and converting the estimated spectral component to said parameterized domain of the frequencies of the speech signal;
   inserting said replacement feature vector into the received feature vector sequence to provide a modified feature vector sequence; and
   performing speech recognition upon the modified feature vector sequence.

2. The method as in claim 1, wherein said parameterized domain comprises a cepstral domain.

3. The method as in claim 1, wherein said parameterized domain comprises a domain determined using a feature vector processing technique which calculates a differential of said transmitted feature vectors.

4. The method as in claim 1, in which said estimating the spectral component of said feature vector uses an interpolation coefficient corresponding to a spectral component of the received feature vector and further comprises updating the interpolation coefficient in response according to one or more received feature vectors.

5. The method as in claim 1, in which a received feature vector includes an additional feature which indicates the position of each feature vector in the sequence of transmitted feature vectors.

6. The method as in claim 5, wherein in said detecting the absence of a feature vector, a feature vector is determined to be missing from the received sequence of feature vectors by checking the feature vector number of each feature vector received.

7. The method as in claim 6, wherein in said sequence of transmitted feature vectors, said generating an estimated replacement feature vector is performed separately for each missing feature vector.

8. The method as in claim 6, wherein in said estimating a spectral component of a replacement feature vector, the corresponding component of the converted feature vector is determined by interpolating a polynomial formed from a time series of said feature vector.

9. A device for performing speech recognition upon a sequence of feature vectors representing a speech signal, wherein said feature vectors comprise features in a parameterized domain determined by processing basic features of the speech signal, the device comprising:

a missing feature vector detector arranged in operation to receive the transmitted feature vectors and to indicate the absence of a feature vector in the received sequence;

a feature vector estimator arranged, in operation, to receive transmitted feature vectors and responsive to said indication from the missing feature vector detector to estimate a replacement feature vector, wherein said feature vector estimator comprises: a first converter for converting a received feature vector of said parameterized domain to a spectral domain, an estimator for estimating a spectral component by interpolating the corresponding component of the converted frame, and a second converter for converting the estimated spectral component to said parameterized domain;

a sequence reconstructer arranged, in operation, to receive transmitted feature vectors and to receive a replacement feature vector and to provide as an output a modified feature vector sequence; and a speech recognizer arranged, in operation, to receive the modified feature vector sequence.

10. The device as in claim 9, wherein said parameterized domain comprises a cepstral domain.

11. The device as in claim 9, wherein said parameterized domain comprises a domain determined using a feature vector processing technique which calculates a differential of said transmitted feature vectors.

12. The device as in claim 9, in which the interpolating uses an interpolation coefficient corresponding to a component of the received feature vector and the interpolation coefficient is updated in response to receipt of a feature vector.

13. A data carrier loadable into and readable by a computer, and carrying instructions for causing the computer to carry out the method according to claim 1.

14. A data carrier loadable into and readable by a computer, and carrying instructions for enabling the computer to provide the device according to claim 9.

* * * * *